Figure 3:
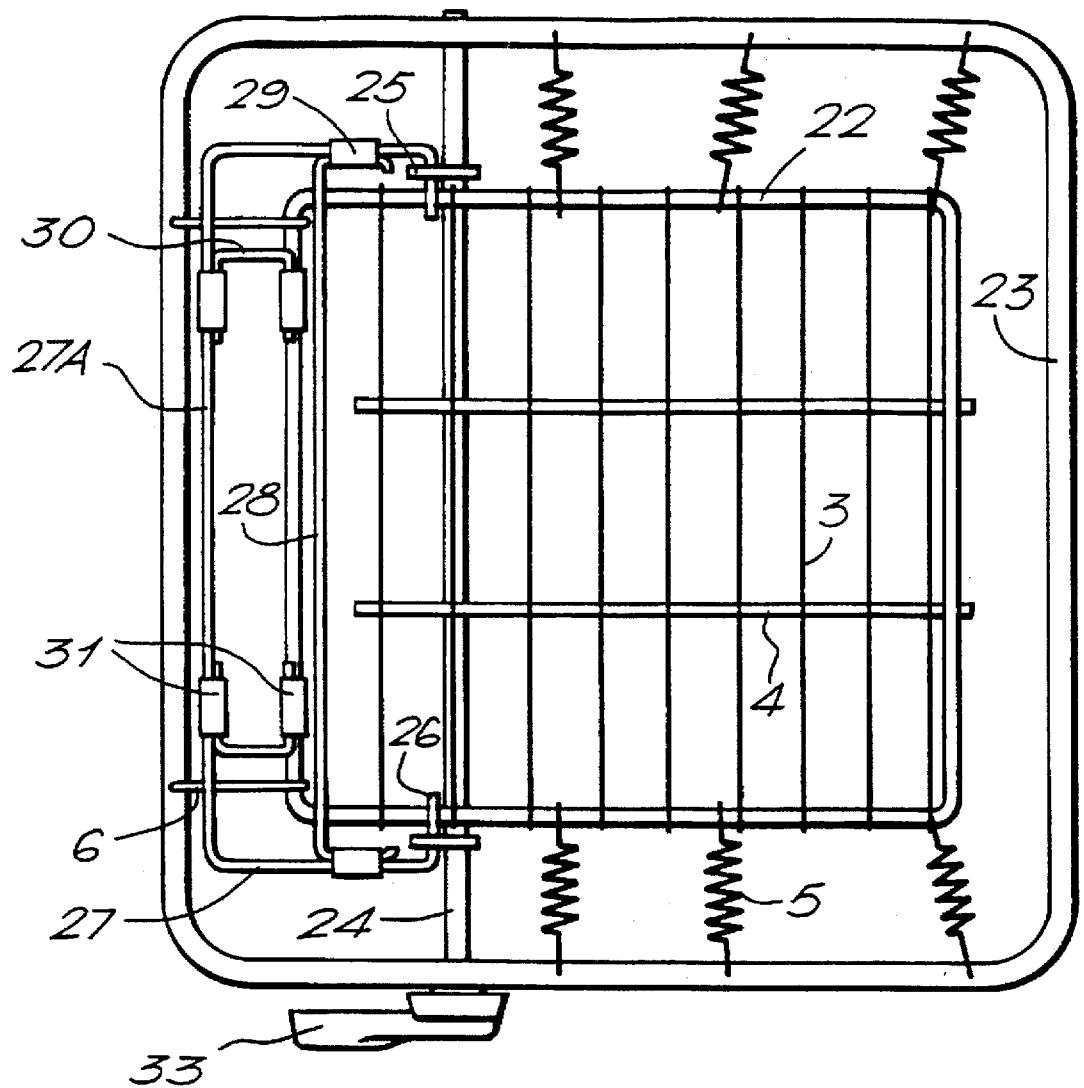

United States Patent [19]
Mitchell

[11] Patent Number: 5,697,672
[45] Date of Patent: Dec. 16, 1997

[54] IMPROVEMENTS IN AND RELATING TO SEAT ARRANGEMENTS PROVIDING ADJUSTABLE SUPPORT

[75] Inventor: Bryan Mitchell, Witney, United Kingdom

[73] Assignee: Pullmaflex U.K. Ltd., United Kingdom

[21] Appl. No.: 669,528

[22] PCT Filed: Jan. 13, 1995

[86] PCT No.: PCT/GB95/00070
    § 371 Date: Jul. 11, 1996
    § 102(e) Date: Jul. 11, 1996

[87] PCT Pub. No.: WO95/19123
    PCT Pub. Date: Jul. 20, 1995

[30] Foreign Application Priority Data

Jan. 13, 1994 [GB] United Kingdom ............ 9400539
Jul. 28, 1994 [GB] United Kingdom ............ 9415234

[51] Int. Cl.[6] .................. A47C 7/14; A47C 7/46
[52] U.S. Cl. ............... 297/284.4; 297/284.8; 297/284.11
[58] Field of Search ............. 297/284.2, 284.4, 297/284.7, 284.8, 284.11

[56] References Cited

U.S. PATENT DOCUMENTS

| | | | |
|---|---|---|---|
| 4,671,569 | 6/1987 | Kazaoka et al. | 297/284.4 |
| 5,007,677 | 4/1991 | Gzawa et al. | 297/284.4 |
| 5,449,219 | 9/1995 | Hay et al. | 297/284.7 |
| 5,474,358 | 12/1995 | Maeyaert | 297/284.7 |

*Primary Examiner*—Peter M. Cuomo
*Assistant Examiner*—Anthony D. Barfield
*Attorney, Agent, or Firm*—Wood, Herron & Evans, L.L.P.

[57] ABSTRACT

A seat arrangement which provides adjustable support has a wire frame structure (1) mounted in a seat in order to support the cushioning material of the seat. Side boundaries of the frame structure are provided by wire portions (2) that extend generally parallel to one another. A first cushion supporting wire element (13) extends transversely with respect to said frame structure (1) and is pivoted thereto about a transverse axis. A second cushion supporting wire element (10) is pivoted with respect to the first wire element (13) about a second axis transverse with respect to the frame structure (1) and actuating means (16,17) is provided for applying a force between the said two wire elements (10,13) to cause articulation thereof about said second axis with movement of the second wire element (10) relatively to the frame structure in a direction generally parallel to the side boundaries thereof (2). The contour of the cushion support provided by the wire frame structure (1) can thus be varied.

12 Claims, 5 Drawing Sheets

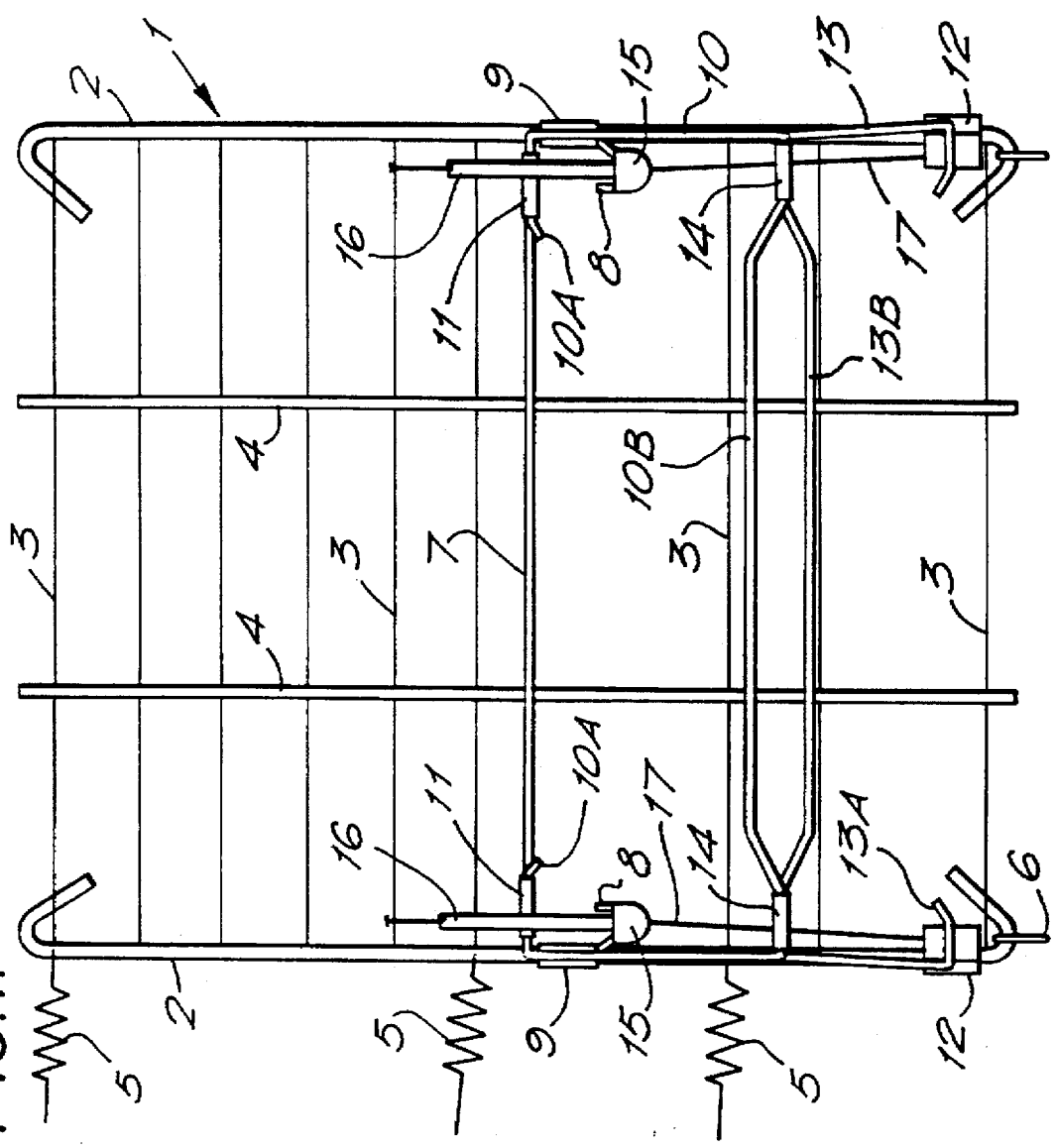

FIG. 9.
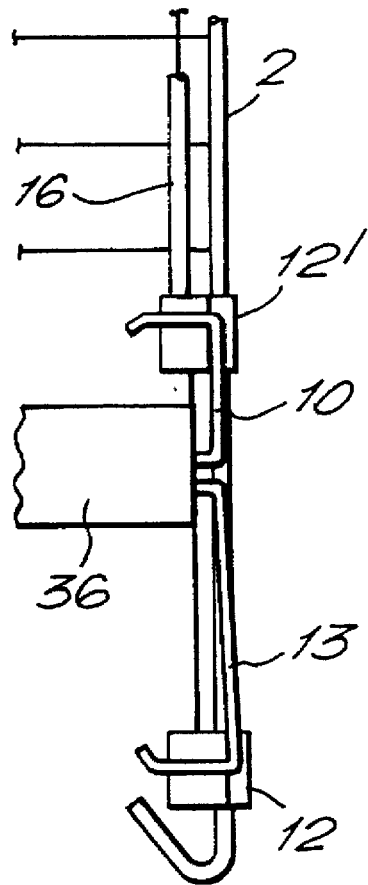
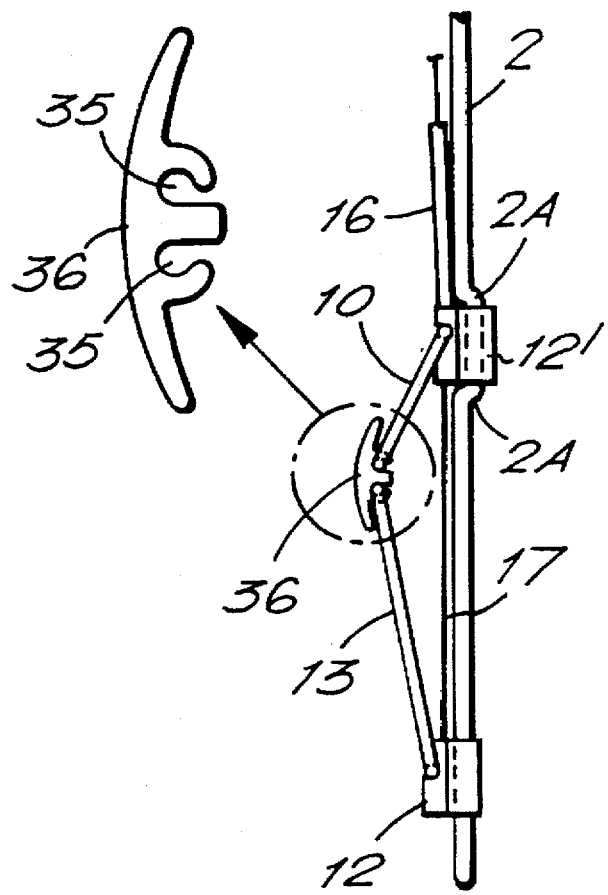
FIG. 10.

5,697,672

IMPROVEMENTS IN AND RELATING TO SEAT ARRANGEMENTS PROVIDING ADJUSTABLE SUPPORT

This invention concerns improvements in seat arrangements providing adjustable support, and relates more particularly to an adjustable support arrangement wherein the adjustable support is provided by a simplified construction incorporating a wire frame for supporting the upholstery material of the seat.

A seat arrangement providing adjustable lumbar support is known, see EP 0 552 904A, wherein adjustable lumbar support is provided by means of an articulated platform element that is arranged to hinge about an articulation point when a force of longitudinal compression is applied at spaced points on the platform element.

Such an arrangement has two primary disadvantages. Firstly, there is a distinct line of contact between a transverse wire of the articulated platform element and the cushioning of the seat material, so that with an increased lumbar support a more pronounced ridge is formed in the platform element, requiring that significant cushioning material be provided over the corresponding part of the platform element in order that the seat may be adequately comfortable.

Secondly, since the increase of lumbar support must be effected by flexing of the platform element and/or displacement thereof against spring loading, the force required to be applied by a manual actuation means is relatively great, so that a relatively high manual force is required to actuate the system and the components of the actuating means are subjected to correspondingly increased wear.

Another disadvantage of the above mentioned system is that it is primarily applicable to a seat construction of the kind in which the platform element is spring-suspended in a seat frame.

It is accordingly an object of the invention to overcome, or at least to reduce, any one or more of the three above-mentioned disadvantages.

In accordance with one aspect of the invention, there is provided a seat arrangement providing adjustable support, comprising a wire frame structure adapted to be mounted in a seat in order to support cushioning material of the seat, side boundaries of which frame structure incorporate wire portions arranged to extend generally parallel to one another, a first cushion supporting wire element extending tranversely with respect to said frame structure and pivoted to the latter about a tranverse axis, a second cushion supporting wire element pivoted with respect to the first wire element about a second axis tranverse with respect to said frame structure, and actuating means for applying a force between the said two wire elements in order to cause articulation thereof about said second axis, coupled with movement of said second wire element relatively to the said frame structure in a direction generally parallel to the side boundaries of said frame structure, in order to vary the contour of the cushion support provided by said wire frame structure.

According to a second aspect of the invention, a seat arrangement providing adjustable support comprises two wire elements intended to be mounted in a seat frame, said wire elements including transversely extending portions that are hinged relatively to one another for articulated movement in order to vary support provided by cushioning extending thereover in a seat, the said wire elements being connected for articulation at points adjacent lateral boundaries of an area within which said support is to be provided, and being angled away from one another in a region located between said points of articulation, whereby the wire elements provide support for cushioning material along two distinct spaced apart lines of contact with the latter.

Further preferred features and corresponding advantages of the invention will become apparent from the following description and any appended claims.

Figure 4:
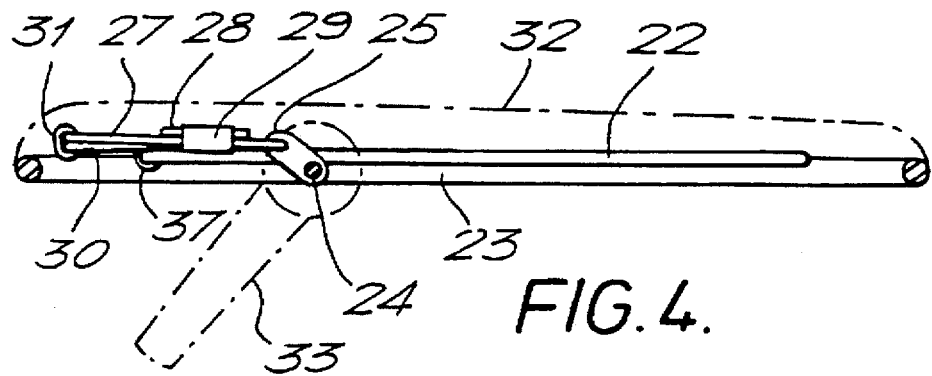
Figure 5:
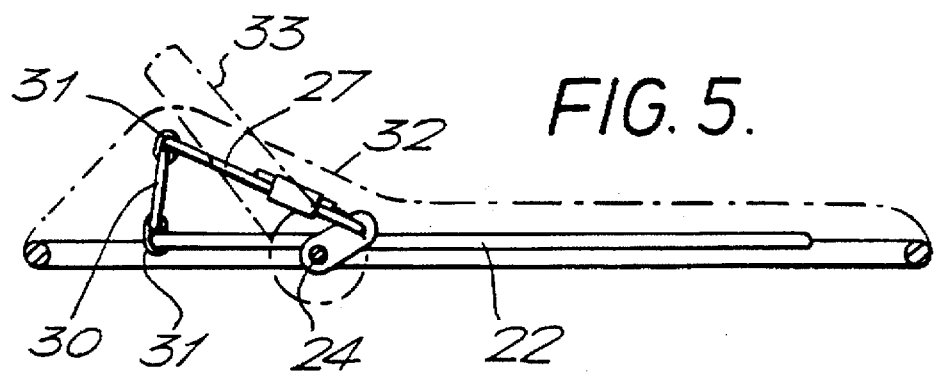
Figure 6:
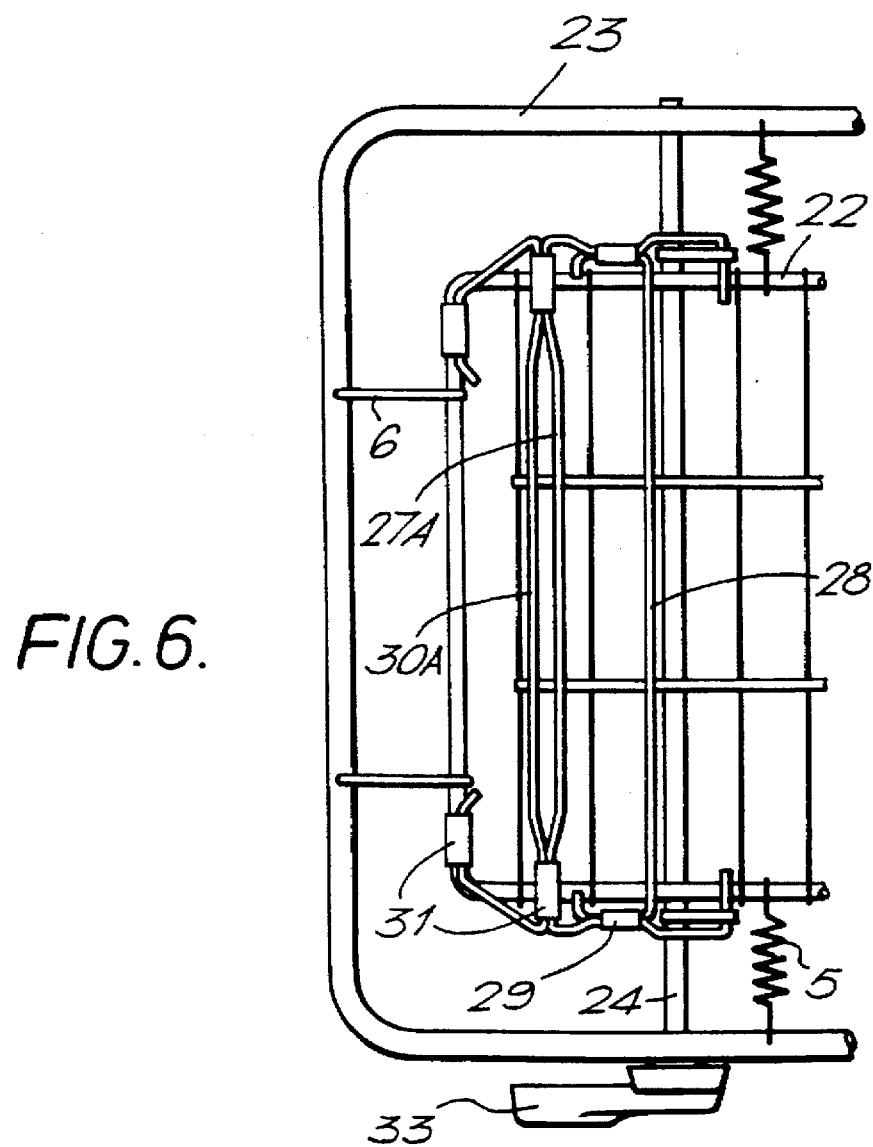
Figure 7:
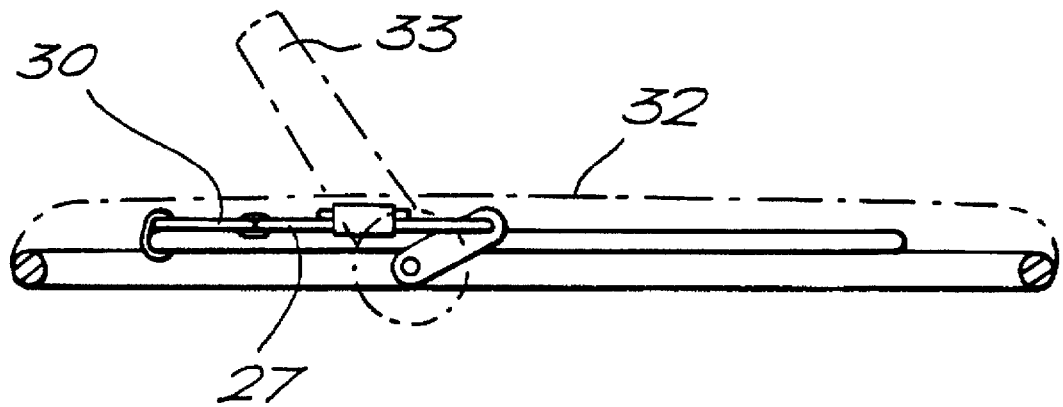
Figure 8:
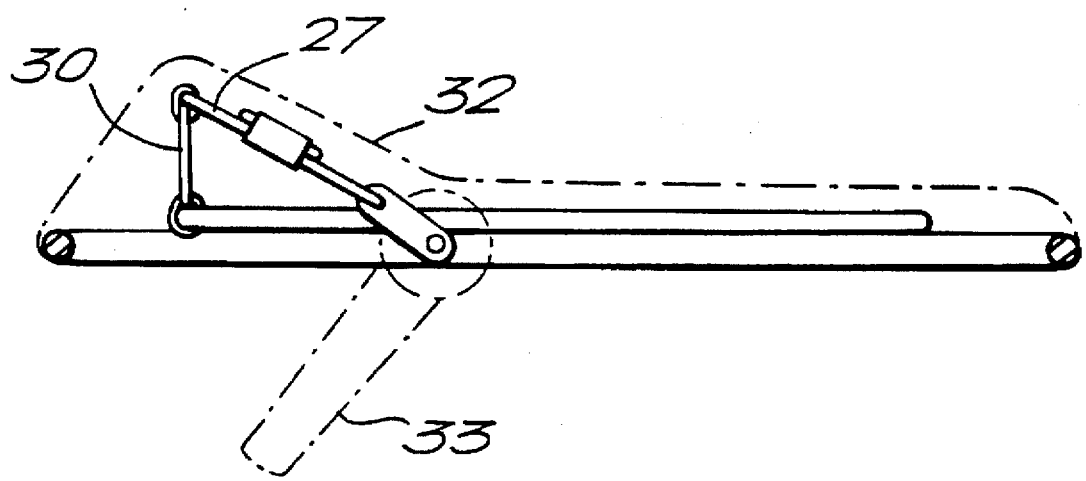

The invention is illustrated by way of example in the accompanying drawings, in which, FIG. 1 is a front elevation of a platform element for incorporation in the frame of a seat back, FIG. 2 is a partial side elevation corresponding to FIG. 1, FIG. 3 is a plan view of the frame of a seat base incorporating a platform element in accordance with a further embodiment of the invention, FIG. 4 is a side elevation corresponding to FIG. 3, shown partly in section, FIG. 5 is a view corresponding to FIG. 4 with the adjustable support shown in an alternative position, FIG. 6 is a partial plan view corresponding to FIG. 3 and showing a modified arrangement in accordance with a further embodiment of the invention, FIG. 7 is a view corresponding to FIG. 4 of the embodiment of FIG. 6, FIG. 8 is a view corresponding to FIG. 5 of the embodiment of FIG. 6, and FIGS. 9 and 10 are fragmentary views corresponding to FIGS. 1 and 2 and showing a further modification of the arrangement illustrated therein.

Referring to the FIGS. 1 and 2 of the drawings, a platform element for incorporation in a seat back in a manner generally as described in EP 0 552 904A comprises a platform element 1 formed by two generally vertically extending lateral wires 2 between which are tensioned a plurality of transverse wires 3 of substantially smaller diameter. The transverse wires 3 penetrate intermediate cords 4 and the assembly is held in a seat frame by means of tension springs and/or wire links, as indicated at 5 and 6.

Such an arrangement is well known, particularly in relation to seats for motor vehicles.

The two lateral wires 2 are interconnected by a transverse wire 7 that is angled in the plane of the platform element 1 to provide inturned wire hooks 8, and which is secured to the lateral wires 2 by means of metal clips 9.

The intermediate horizontal portion of the wire 7 serves as a mounting for a wire element 10 having inturned ends 10A that are secured to the wire 7 by means of metal clips 11 in such a manner that the element 10 can pivot about an axis parallel to that of the intermediate portion of the wire 7.

Two blocks 12 of plastics material engage the wires 2 in such a manner that they are longitudinally slidable thereon, for example by engagement of the wires 2 in bores in the blocks 12, or by snap-fitting thereof in undercut grooves in the blocks 12.

A second wire element 13 has inturned ends 13A that are snap-fitted in undercut grooves in the plastics blocks 12 in such a manner that the element 13 can pivot relatively to the blocks 12 about a tranverse axis.

The wire elements 10 and 13 are of generally U-shaped configuration, having intermediate portions 10B and 13B that are secured together by metal clips 14 in such a manner that the elements 10 and 13 can pivot relatively to one another about a transverse axis extending through the two clips 14.

As can be seen more clearly in FIG. 1, the intermediate portions 10B and 13B of the elements 10 and 13 are angled away from one another in the region between the clips 14 in such a manner that they can make line contact with cushioning material of the seat along lines that are spaced apart with reference to the upright axis of the seat back.

The two hooked portions 8 of the wire 7 support further blocks 15 that are shaped to interengage with the wire hooks and incorporate bores for accommodating the outer sheaths 16 and the inner wires 17 of a Bowden cable actuating mechanism. The ends of the inner wires 17 are anchored to the plastics blocks 12.

In operation of the device described, the platform element 1, which is suspended in the seat frame as already described, provides, together with the wire elements 10 and 13, support for the upholstery of a seat back.

Since the wire elements 10 and 13 are angled to form a ridge, as shown more clearly in FIG. 2, lumbar support is provided for the occupant of the seat.

In order to provide for increased lumbar support, the occupant of the seat may actuate the Bowden cable mechanism to draw together the two sets of plastics blocks 12 and 15. Since the blocks 15 are fixed with respect to the lateral wires 2, the plastics blocks 12 are thus caused to slide upwardly along the lower portions of the lateral wires 2, reducing the distance between the inturned ends 10A and 13A of the wire elements 10 and 13. The angle included between the wire elements 10 and 13 as shown in FIG. 2 and indicated at A is thus reduced, so that the intermediate portions 10B and 13B of the wire elements 10 and 13 are pushed forwardly to increase the lumbar support afforded to the occupant of the seat. Since the portions 10B and 13B are spaced apart in the vertical direction, the reducing angle between the wire elements 10 and 13 does not cause the apex of the triangle formed by wires 10 and 13 to be more sharply defined, unlike known mechanisms, and the comfort of the occupant of the seat can be maintained without the requirement for significantly increased padding.

Furthermore, the fact that the Bowden cable mechanism is only required to cause pivoting movement of the wires 10 and 13 accompanied by sliding movement of the blocks 12 means that the actuating force required to increase the lumbar support is significantly reduced in comparison with systems in which flexing of the platform element 1 itself is necessary.

It will be appreciated that various alterations and modifications may be made to the above described embodiment of the invention without departing from the scope of the invention. In particular, instead of mounting the wire elements 10 and 13 to the lateral wires 2 and a transverse wire 7 connected thereto, an independent wire frame structure may be designed to support both the wire element 10 and the mounting blocks 12 and 15, so that an adjustable lumbar support can be retro-fitted to a seat structure in which the platform element 1 is either not provided, or is directly supported in a seat frame without the use of suspension springs such as the springs 5.

FIGS. 3–5 of the drawings show another arrangement wherein the platform providing adjustable support in the manner generally described above is adapted to provide adjustable thigh support in a seat base. In this case, a platform element 1 comprises a circumferential wire 22 replacing the lateral wires 2 of the previous embodiment. As in the case of the embodiment of FIGS. 1 and 2 the platform element comprises transverse wires 3 and cords 4 and is held in a frame 23 of a seat base by means of tension springs 5 and wire links 6. In this embodiment the Bowden cable actuating mechanism is omitted, a shaft 24 pivoted in the frame 23 carrying lever arms 25 that engage with inturned ends 26 of a wire element 27 that is generally U-shaped and that is reinforced by a further U-shaped wire 28 secured thereto by clips 29. A transverse portion 27A of the wire 27 is articulated to a front edge of the wire 22 via further U-shaped wires 30 the inturned ends of which are engaged in clips 31 that enable the wires 30 to pivot with respect to both the wire element 27 and the wire 22 of the platform element 1. Referring to FIGS. 4 and 5, it will be seen that the adjustable support can be switched between two end positions shown respectively in FIG. 4 and FIG. 5, wherein the contour of the upholstery of a seat base as indicated in chain-dotted lines 32 can be changed from a generally flat condition (FIG. 4) to a raised condition (FIG. 5) providing thigh support for the occupant of the seat.

It will be appreciated that the upholstery material represented by the chain-dotted line 32 is of a material that can stretch sufficiently to accommodate the change in shape, and that is supported from the platform element 1 and the associated support mechanism by means of a relatively thin layer of foam material interposed between the platform element 1 and the upholstery material 32, the latter being clipped to the periphery of the frame 23 in conventional manner.

Thus, by manual actuation of a lever 33 linked to the shaft 24 in order to move the lever arms 25 from the position of FIG. 4 to that of FIG. 5, the linkage formed by the wire elements 27 and 30 can be raised to provide effective thigh support. Such an arrangement is of particular advantage in a folding occasional seat for a motor vehicle, in which thigh support for the occupant of the seat can be provided in the position of FIG. 5, whilst allowing the seat to be adjusted to the flat condition of FIG. 4 for collapsing and more compact stowage of the seat. In such an arrangement, the manual actuating lever 33 could suitably be replaced by a lever coupled to the pivoted frame assembly of the seat in such a manner that the support arrangement of the seat base is moved automatically from the position of FIG. 5 to that of FIG. 4 when the base frame 23 is pivoted from a generally horizontal to an upright position for stowage.

FIGS. 6–8 of the drawings show a modification of the arrangement of FIGS. 3–5, wherein the adjustable support is more similar to that of FIGS. 1 and 2, in that the articulated support members, when in the flat condition, lie at approximately 180° to one another rather than being folded to an over-centre condition as in FIGS. 3–5. In this arrangement the elements corresponding with those of FIGS. 3–5 are illustrated with the same reference numerals, and the operation of the device is generally similar. In this arrangement, however, the separate U-shaped wires 30 are replaced by a single wire that is angled outwardly beyond the lateral periphery of the wire 22 so that the clips 31 providing the articulation between the wires 27 and 30 are located at the lateral boundaries of the seat support arrangement, intermediate portions 27A and 30A of the wires 27 and 30 being angled away from one another to distribute support provided for the seat upholstery, as in the case of the wires 10 and 13 of the embodiment of FIGS. 1 and 2. Movement of the support arrangement from the generally flat condition of FIG. 7 to the raised condition of FIG. 8 is effected by movement of the lever 33 in an anti-clockwise direction as viewed in the drawings, i.e. in the reverse direction to that of the embodiment of FIGS. 3–6. As in the case of the previous embodiment, the lever 33 .could be replaced by a linkage that is automatically actuated upon folding of the seat.

FIGS. 9 and 10 show a yet further modification of the embodiment of FIGS. 1 and 2, such an arrangement also being applicable to the later embodiments of FIGS. 3–8, with suitable adaptation of the arrangements described.

FIG. 9 shows a fragment corresponding to the lower right hand portion of FIG. 1, whereas FIG. 10 corresponds generally to FIG. 2. In this arrangement, elements corresponding to those of FIGS. 1 and 2 are illustrated with the same reference numerals. It will be seen that the wire 7 with hooks 8 and clips 9 has been omitted, and wire 10 is modified so that instead of being clipped to wire 7 by clips 11, it snaps into plastics blocks 12' that are identical to the blocks 12 but are fitted to the side wires 2 in the reverse direction. As seen from FIG. 10, the side wires 2 are joggled at 2A to prevent the blocks 12' from sliding thereon. The blocks 12' receive the Bowden cables 16, 17 in the manner previously described for the blocks 15, which are now omitted.

The intermediate portions 10B and 13B of the wires 10 and 13 now remain straight instead of-being angled, and the clips 14 are omitted. The straight portions 10B and 13B are snapped into recesses 35 of a plastics moulding 36 having a section as shown in the enlarged detail of FIG. 10. The plastics moulding 36 thus extends tranversely across the platform element 1 to provide distributed support for the upholstery of the seat in place of the angled portions 10B and 13B of the previous embodiment. The wires 10 and 13 can pivot in the recesses 35 and thus the moulding 36 also provides the necessary articulation between the wires 10 and 13.

I claim:

1. A seat arrangement providing adjustable support, comprising a wire frame structure adapted to be mounted in seat in order to support cushioning material of the seat, side boundaries of which frame structure incorporate wire portions arranged to extend generally parallel to one another, a first cushion supporting wire element extending transversely with respect to said frame structure and pivoted to the latter about a first transverse axis, a second cushion supporting wire element pivoted with respect to the first wire element about a second axis transverse with respect to said frame structure, and actuating means for applying a force between the said two wire elements in order to cause articulation thereof about said second axis, coupled with movement of said second wire element relatively to the said frame structure in a direction generally parallel to the side boundaries of said frame structure, in order to vary a contour of cushioning material supported by said wire frame structure.

2. A seat arrangement according to claim 1, wherein said first wire element comprises a generally U-shaped element with inturned ends that are journalled in pivots linked to the said wire frame structure at the first transverse axis, the base of the generally U-shaped element being arranged to extend adjacent a wire edge of said second cushion supporting wire element at said second transverse axis.

3. A seat arrangement being a modification of that claimed in claim 2, wherein said generally U-shaped element is replaced by two spaced wire links, each of which is pivotally linked to said wire frame structure at the first transverse axis and to said second cushion supporting wire element at said second transverse axis.

4. A seat arrangement according to claim 1 or 2 wherein said second wire element is guided for movement relatively to said frame structure by means of guide blocks pivotally linked thereto about a further transverse axis remote from said second transverse axis and slidably engaged with said wire portions of said frame structure.

5. A seat arrangement according to claim 4, wherein said guide blocks comprise blocks of resilient synthetic plastics material each having two undercut linear grooves extending in planes at right angles to one another, of which one of said grooves makes snap engagement with a said wire portion of said frame structure and can slide thereon and of which the other makes snap engagement with a wire edge of said second wire element that extends on said further transverse axis, and can pivot relatively thereto.

6. A seat arrangement according to any one of claims 1–3, wherein said second wire element is guided for movement relatively to said frame structure by a lever element forming part of said actuating means, pivotally mounted about a transverse axis and having spaced lever arms of which the ends are pivotally linked to said second wire element about a further transverse axis remote from said second transverse axis.

7. A seat arrangement according to any one of claims 1–3 and 5, wherein said first and second wire elements are pivotally linked at said second transverse axis by means of clips embracing parallel wire portions at respective edges of said wire elements.

8. A seat arrangement according to claim 7, wherein intermediate parts of said parallel wire portions between two said clips which are adapted to be adjacent lateral margins of the seat are angled away from one another to provide distributed support for cushioning material of the seat.

9. A seat arrangement according to any one of claims 1, 2, or 5, wherein said first and second wire elements are pivotally linked at said second transverse axis by means of a rail of resilient synthetic plastics material having a pair of undercut grooves making snap engagement with edge wires of said elements, said rail being shaped to provide distributed support for said cushioning material.

10. A seat arrangement as claimed in any one of claims 1, 2, or 5, wherein said first and second wire elements are mounted in a seat back and the arrangement is such that said variation of the contour of the seat back provides adjustable lumbar support for an occupant of the seat.

11. A seat arrangement as claimed in any one of claims 1–3, wherein said first and second wire elements are mounted in a seat base and the arrangement is such that said variation of the contour of the seat base provides thigh support for an occupant of the seat.

12. A seat arrangement as claimed in claim 11, mounted in a folding seat, wherein the arrangement is such that the contour of the seat base is variable from a substantially flat condition for folding of the seat to an angled condition providing said thigh support.

* * * * *